(12) United States Patent
Shehory

(10) Patent No.: US 9,298,584 B2
(45) Date of Patent: Mar. 29, 2016

(54) ARTIFACT SELECTION USING TEXTUAL REPORTS

(71) Applicant: International Business Machines Corporation, Armonk, NY (US)

(72) Inventor: Onn Menahem Shehory, Yahud-Monosson (IL)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 14/205,458

(22) Filed: Mar. 12, 2014

(65) Prior Publication Data

US 2015/0261661 A1    Sep. 17, 2015

(51) Int. Cl.
*G06F 11/00*    (2006.01)
*G06F 11/36*    (2006.01)

(52) U.S. Cl.
CPC ........ *G06F 11/3616* (2013.01); *G06F 11/3692* (2013.01)

(58) Field of Classification Search
CPC . G06F 11/079; G06F 11/302; G06F 11/3452; G06F 11/3616; G06F 11/3664; G06F 11/3692
See application file for complete search history.

(56) References Cited

U.S. PATENT DOCUMENTS

| | | | |
|---|---|---|---|
| 7,234,131 B1 * | 6/2007 | Speyrer | G06Q 10/06 705/7.42 |
| 7,490,319 B2 | 2/2009 | Blackwell et al. | |
| 7,757,125 B2 * | 7/2010 | Bassin | G06F 11/3616 702/185 |
| 8,151,248 B1 * | 4/2012 | Butler | G06F 11/368 717/124 |
| 8,276,123 B1 | 9/2012 | Deng et al. | |
| 8,689,241 B2 * | 4/2014 | Naik | G06F 11/0781 719/318 |
| 2010/0211924 A1 * | 8/2010 | Begel | G06F 8/74 717/101 |
| 2011/0016452 A1 | 1/2011 | Gorthi et al. | |
| 2011/0067006 A1 * | 3/2011 | Baker | G06F 9/44589 717/127 |
| 2012/0159420 A1 * | 6/2012 | Yassin | G06F 11/3672 717/101 |

OTHER PUBLICATIONS

Rastkar et al.; "Summarizing Software Artifacts: A Case Study of Bug Reports;" ICSE '10; May 2010; pp. 505-514.*

* cited by examiner

*Primary Examiner* — Joseph Kudirka
(74) *Attorney, Agent, or Firm* — Ziv Glazberg

(57) ABSTRACT

Artifact selection by obtaining textual reports indicating potential defects in a program product. The textual reports are associated with artifacts of the program product. The textual reports and artifacts are automatically analyzed to estimate severity of potential errors in the artifacts of the program product, by utilizing a statistical model to estimate the severity based on content of the textual reports. The statistical model is trained with respect to a training dataset. A subset of the artifacts is determined based on the estimated severity.

15 Claims, 2 Drawing Sheets

ARTIFACT SELECTION USING TEXTUAL REPORTS

TECHNICAL FIELD

Figure 1:
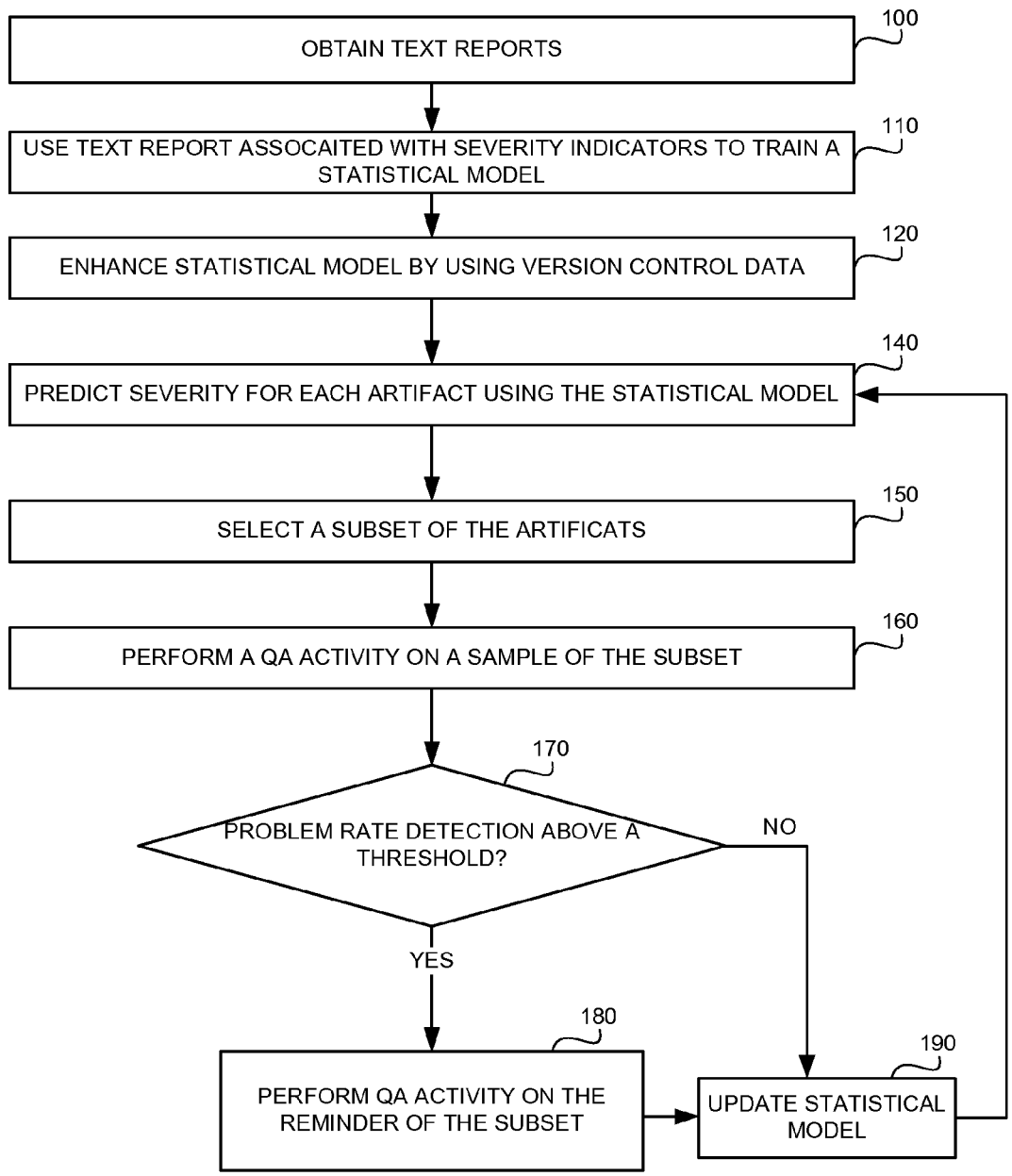

The present disclosure relates to testing and quality assurance review in general, and to selection of artifacts to be tested and/or reviewed, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During the testing phase a System Under Test (SUT) may be subject to quality assurance (QA) activities, such as but not limited to code review, design review, specification review, testing, or the like. The SUT may be, for example, a computer program, a hardware device, a firmware, an embedded device, a component thereof, or the like.

However, QA activities may consume resources, such as time, manual labor, processor time, or the like. As a result, in some cases, during the testing phase not all possible QA activities are performed due to constraints on the resources available.

BRIEF SUMMARY

One exemplary embodiment of the disclosed subject matter is a computerized apparatus having a processor, the processor being adapted to perform the steps of: obtaining one or more textual reports indicating potential defects in a program product, wherein each textual report is associated with an artifact of the program product; automatically analyzing the textual reports and artifacts to estimate severity of potential errors in the artifacts of the program product; and determining a subset of the artifacts based on the estimated severity.

Another exemplary embodiment of the disclosed subject matter is a method comprising: obtaining one or more textual reports indicating potential defects in a program product, wherein each textual report is associated with an artifact of the program product; automatically analyzing, by a processor, the textual reports and artifacts to estimate severity of potential errors in the artifacts of the program product; and determining, by the processor, a subset of the artifacts based on the estimated severity.

Yet another exemplary embodiment of the disclosed subject matter is a computer program product comprising a non-transitory computer readable medium retaining program instructions, which instructions when read by a processor, cause the processor to perform a method comprising: obtaining one or more textual reports indicating potential defects in a program product, wherein each textual report is associated with an artifact of the program product; automatically analyzing the textual reports and artifacts to estimate severity of potential errors in the artifacts of the program product; and determining a subset of the artifacts based on the estimated severity.

THE BRIEF DESCRIPTION OF THE SEVERAL VIEWS OF THE DRAWINGS

Figure 2:
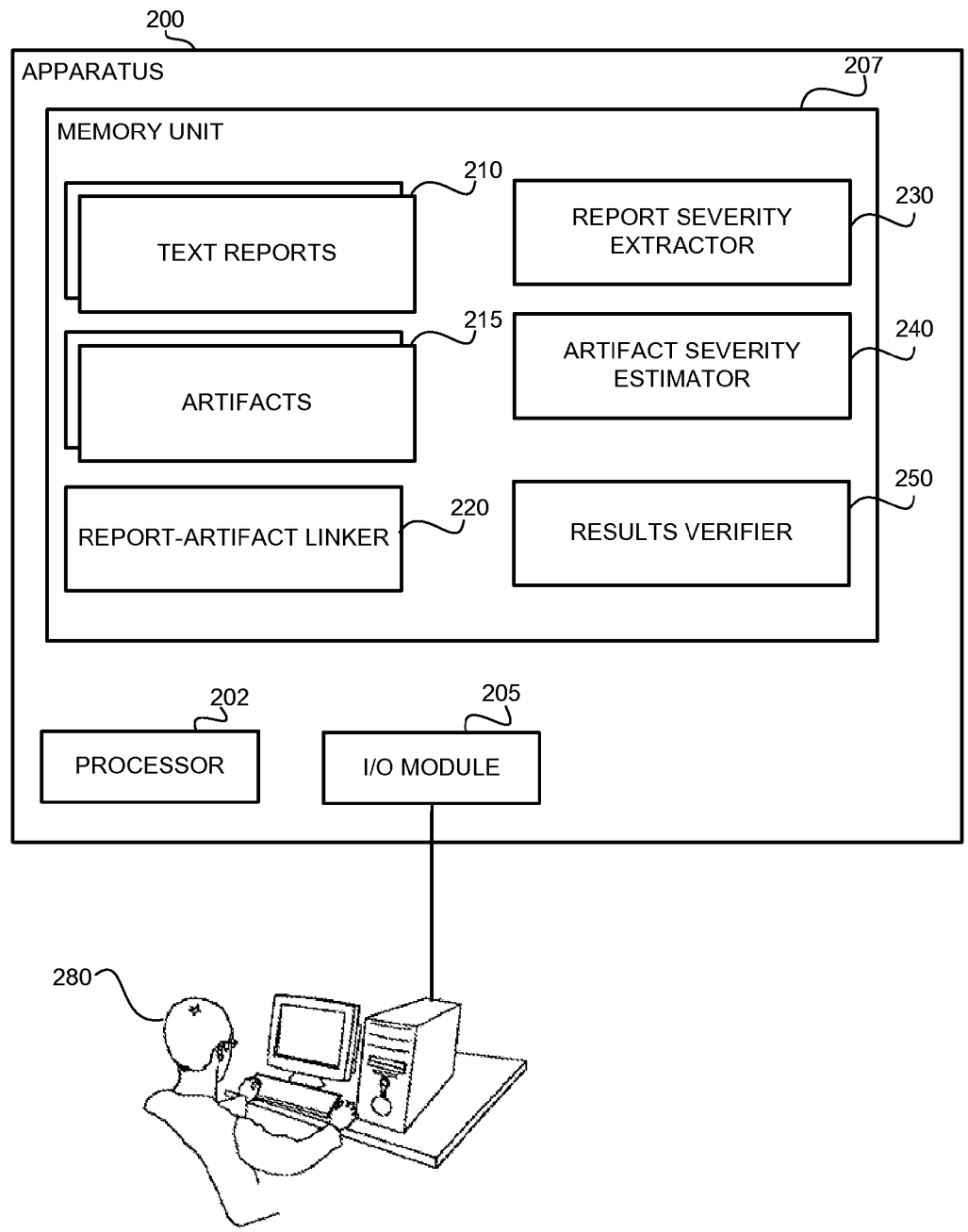

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method, in accordance with some exemplary embodiments of the disclosed subject matter; and FIG. 2 shows a block diagram of an apparatus, in accordance with some exemplary embodiments of the disclosed subject matter.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem addressed by the disclosed subject matter is to select artifacts of a computer program to be tested, to be manually reviewed, or to be the subject of other quality assurance (QA) activities. The artifact may be program code of the computer program, requirement documents, design documents, or the like.

As the QA activities may consume resources, such as time, manual labor, processor time, or the like, in some cases, during testing phase not all possible QA activities are performed due to constraints on the resources available, and a selection of a subset of the artifacts may be desirable.

Artifact selection may be different than test selection, as test selection may include identifying a subset of a test suite, whereas artifact selection identifies a subset of the artifacts. As an example, artifact selection may select a subset of the code files to be tested, whereas test selection may select a subset of a test suite to be used to test the entire program. Although in some cases, the selected tests may be targeted to testing specific code artifacts, test selection itself selects tests and not of artifacts.

In some exemplary embodiments, the disclosed subject matter may address the technical problem of identifying suitable candidates for review and testing.

One technical solution utilized by the disclosed subject matter is to use textual reports that are indicative of potential defects in the program in order to estimate severity of potential errors in each artifact. Based on the severity criteria, which may or may not, also address the estimated probability of an existence of a defect, the artifacts may be selected. Based on the estimated severity, a subset of the artifacts may be selected and the QA activity may be performed on the subset.

In some cases, a severity measurement may be indicative of potential defects with high impact on the system, critical errors, or the like. As an example, a defect which may result in a system outage may be considered critical in high availability systems. As another example, error in calculations of important data may be considered of high severity. As yet another example, saving partial data and losing important data items may be considered as a high severity. Some examples of low severity defects may be, for example, slowdown in a non-essential component of the system, infrequent Graphical User Interface (GUI) crashes (e.g., blue screen in Windows™), not storing restorable data, or the like.

In some exemplary embodiments, the textual reports may be manual reports inputted by users, such as but not limited to a problem report provided by a user of the program product, a defect report provided by quality assurance personnel, such as after investigating a problem report or after addressing concerns raised by the customer, or a similar report. In some exemplary embodiments, the textual report may be automatically generated such as error logs, logs, or the likes. In some exemplary embodiments, the textual report may include free text. Additionally or alternatively, the textual report may include structured data, such as indicating a severity of the error reported, an artifact of the computer program to which the report relates, or the like.

In some exemplary embodiments, the disclosed subject matter provides an automated selection method of artifacts for review or for testing. The disclosed subject matter may utilize data available in development repositories, such as version control data, defect log data and the like, to automatically identify artifacts for which defects were reported or changes were applied. In some cases, the input data may include explicit severity indicators (e.g., a scale such as: critical, high, medium, low). Additionally or alternatively, the disclosed subject matter may estimate severity indicators based on text analysis. In some exemplary embodiments, a feedback loop may be used in which the computed severity grade may be verified and refined.

In one embodiment, the disclosed subject matter may be implemented by performing (1) pre-processing of log and version control data, from which defect and change data may be extracted; (2) severity computation and setting, in which the pre-processed data may be analyzed to determine a severity grade of artifacts for which review, test or other QA activities are intended; and (3) providing a recommendation based on severity, impact and other quality metrics. The recommendation may be based on a subset of the artifacts in view of the quality metrics.

In some exemplary embodiments, iterative process may be performed until a target quality level is reached or until time and resource are exhausted. After each iteration, the QA activity may be performed on a sample of the subset and the results may be used to refine or reinforce severity grading and the set of keywords used for computing severity. In some embodiments, a success may lead to positive reinforcement/refinement, and a failure may lead to negative ones. An automated feedback loop may be utilized. Additionally or alternatively, feedback from experts and practitioners may be incorporated when available.

One technical effect of the disclosed subject matter is automatically identifying a subset of the artifacts to be the subject of a QA activity thereby preserving resources for other QA tasks.

Another technical effect may be predicting a potential error of a high severity in an artifact which was not previously known to have a defect. As opposed to relying strictly on version control information, the disclosed subject matter may utilize text analysis to identify artifacts that are similar enough to other artifacts which exhibited severe errors in the past, and as a result indicate that the artifacts are to be subject to the QA activity. The disclosed subject may identify new artifacts as potentially being associated with errors of high severity. Additionally or alternatively, artifacts which exhibited only non-severe errors in the past may be predicted to include a relatively high potential of severe problems in view of their modification.

Yet another technical effect may be to be able to distinguish between subjective severity indications of end-users and more objective severity indicators provided by QA staff members. In some cases, an end-user may indicate high severity to non-issues, to feature requests, or the like, in anticipation that such an indication may encourage the vendor of the program product to react quickly. However, such indications may not truly be of severe nature. In some exemplary embodiments, wrong severity classification may reduce the quality of the results. However, the disclosed subject matter may utilize text analysis to overcome such an issue and to rely on the textual analysis to estimate severity.

Referring now to FIG. 1 showing a flowchart diagram of a method, in accordance with some exemplary embodiments of the disclosed subject matter.

In Step 100, text reports may be obtained. The text reports may be obtained from a repository. The text reports may be automatically generated, manually created, or the like.

In Step 110, a statistical model may be trained based on text reports which are associated with severity indicators. In some exemplary embodiments, the severity indicators may be included in structured data of the text reports. In some exemplary embodiments, text reports for which the severity indicators were inputted by QA personnel or verified by such staff members may be used, as opposed to severity indicators that were inputted by end users and not verified by authorized personnel. In some exemplary embodiments, all text reports having severity indicators may be used. In some exemplary embodiments, the statistical model may be a model such as linear regression model, logistic regression model, general linear/non-linear model, or the like. Additionally or alternatively, the statistical model may be a form of machine learning, such as Support Vector Machine (SVM), Decision Tree Learning, other supervised or non-supervised learning techniques, or the like. In some exemplary embodiments, the training phase for the machine learning may be performed in Step 110. In some exemplary embodiments, Step 120 may also be part of the training phase.

In some exemplary embodiments, the statistical model may be configured to match between a text of the artifact, text of reports and the severity. Additionally or alternatively, statistical models may be used to estimate connection between reports and artifacts based on their texts. Additionally or alternatively, statistical models may be used to estimate similarity between artifacts so as to deduce from a report associated with a first artifact to a potential problem with other reports. In some exemplary embodiments, based on textual similarity of artifacts, the disclosed subject matter may predict severe problems with new artifacts or with artifacts that have never previously exemplified severe problems.

In Step 120, the statistical model may be enhanced using version control data. In some exemplary embodiments, version control data may be used to identify modifications to the artifacts and severity of fixed bugs. In some exemplary embodiments, the version control data may be used to verify severity labels of text reports. In some exemplary embodiments, version control data may include element and component names, update time and date, type of update, textual description of the update and its reason, person(s) in charge of or involved in the update, system version, dependencies, and the like. These data can be used to check e.g., frequency of updates of a specific element or component, updates for a specific reason, connection between people and updates, etc.

In Step 140, a severity of each artifact may be predicted. The prediction may be based on the statistical model. In some exemplary embodiments, the severity may be indicated using a number, such as between zero and one. Additionally or alternatively, the severity may be indicated using predetermined categories. The disclosed subject matter is not limited to any specific representation form and other forms of representations may be used in addition to or instead of the examples described above.

In Step 150, a subset of the artifacts may be selected. The subset may be selected based on the severity indicators. In some exemplary embodiments, a predetermined top percentile, such as the top 10%, may be selected. In some exemplary embodiments, all artifacts above a predetermined threshold, such as above a severity measurement of 0.6, may be included in the subset. Additionally or alternatively, the subset may include a predetermined number of artifacts, such as 200 artifacts, and may include out of the artifacts those that have the highest severity measurements.

In Step 160, the QA activity may be performed on a sample of the subset. The sample may include, for example, 30 artifacts, 5% of the subset, or the like. In some exemplary embodiments, the QA activity may be performed automatically, such as by automatically executing tests on each artifact of the sample. Additionally or alternatively, the QA activity may be performed manually, such as by manually testing the artifact, manually reviewing the artifact, or the like.

Based on the QA activities performed on the sample, a rate of detecting problems may be determined. The rate may indicate a rate in which problems with relatively high severity were encountered. In Step 170, in case the rate is above a predetermined threshold, the sample may be indicative that the artifact selection successfully identified artifacts with a potential of high severity problems. In such a case, the reminder of the subset may be used and the QA activity may be performed on the reminder (Step 180). The statistical model may be updated to reinforce its selection which was proved to be beneficial (Step 190). In some exemplary embodiments, the method may end at this point.

In case the rate is below the predetermined threshold, the sample may be indicative that the artifact selection has not identified the correct artifacts. The statistical model may be updated (Step 190) so as to indicate that the artifacts of the sample should have been assigned a lower severity values. After the statistical model is updated, Steps 140-170 may be performed again so as to re-select a subset. In some cases, another attempt to re-select artifacts may not be performed in case designated resources, such as time, have depleted. In some cases, the selection attempt may be performed up to a predetermined number of times, such as up to ten times.

In some exemplary embodiments, the predetermined threshold of Step 170 may be an expected threshold of problem detection rate in all artifacts. In some exemplary embodiments, the problem detection rate may or may not relate solely to severe problems.

In some exemplary embodiments, the statistical model may be updated in Step 190 to reinforce some severity measurements of some artifacts and refine the severity grading of others. In some exemplary embodiments, a user may indicate, after performing the QA activity on each artifact, whether he believes the severity grading was correct or incorrect. Such information may be used to update the statistical model.

Referring now to FIG. 2 showing a block diagram of components of an apparatus, in accordance with some exemplary embodiments of the disclosed subject matter. An apparatus 200 may be a computerized apparatus adapted to perform methods such as depicted in FIG. 1.

In some exemplary embodiments, Apparatus 200 may comprise a Processor 202. Processor 202 may be a Central Processing Unit (CPU), a microprocessor, an electronic circuit, an Integrated Circuit (IC) or the like. Alternatively, Apparatus 200 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 202 may be utilized to perform computations required by Apparatus 200 or any of it subcomponents.

In some exemplary embodiments of the disclosed subject matter, Apparatus 200 may comprise an Input/Output (I/O) Module 205 such as a terminal, a display, a keyboard, an input device or the like to interact with the system, to invoke the system and to receive results. It will however be appreciated that the system can operate without human operation.

In some exemplary embodiments, the I/O Module 205 may be utilized to provide an interface to a User 280 to interact with Apparatus 200, such as to provide the text reports, to review and potentially modify severity grading, the review artifacts subsets or samples thereof, or the like.

In some exemplary embodiments, Apparatus 200 may comprise a Memory Unit 207. Memory Unit 207 may be persistent or volatile. For example, Memory Unit 207 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 207 may retain program code operative to cause Processor 202 to perform acts associated with any of the steps shown in FIG. 1.

Text Reports 210, such as problem reports, defect reports, logs, or the like, may be retained within Memory Unit 207 or another repository. In some exemplary embodiments, Text Reports 207 may be retrieved to Memory Unit 207 to allow analysis thereof.

In some exemplary embodiments, Memory Unit 207 may further retain Artifacts 215. In some exemplary embodiments, Artifacts 215 may include text, such as code, design information, specification, or the like.

The components detailed below may be implemented as one or more sets of interrelated computer instructions, executed for example by Processor 202 or by another processor. The components may be arranged as one or more executable files, dynamic libraries, static libraries, methods, functions, services, or the like, programmed in any programming language and under any computing environment.

A Report-Artifact Linker 220 may be configured to link between a report and an artifact. In some exemplary embodiments, the link may be established based on the text of the report, the text of the artifact, or the like. In some exemplary embodiments, text similarity between the texts of the report and the artifact may indicate a linkage. Additionally or alternatively, text analysis of other reports that were linked to this artifact or to other similar artifacts, may be used to deduce the connection between the report and the artifact. In some exemplary embodiments, the report may include an explicit indication of the linked artifact, such as in structured data, in the text, or the like. Based on explicit indication, the linkage may be determined. In some exemplary embodiments, the linkage may be based on a combination of the above mentioned techniques, such as not to rely specifically on user input on the one hand (e.g., explicit indication) but make use of such input when possible.

A Report Severity Extractor 230 may be configured to extract a severity measurement from a report. In some exemplary embodiments, the report may include a severity indicator. In some exemplary embodiments, the severity indication may be structured data of the report. In some exemplary embodiments, the severity measurement may be predicted based on a textual analysis of the report.

An Artifact Severity Estimator 240 may be configured to predict a severity measurement for an artifact. The severity may be predicted based on textual reports that are associated with the artifact (e.g., as determined by Report-Artifact Linker 220) and based on their severity (e.g., as determined by Report Severity Extractor 230).

In some exemplary embodiments, Artifact Severity Estimator 240 may define a statistical model based on training data and utilize the statistical model in making prediction.

A Results Verifier 250 may be used to update the statistical model based on the results of the prediction. In some exemplary embodiments, in case an expected rate of error discovery is met, Results Verifier 250 may reinforce the statistical model. Additionally or alternatively, in case the rate is not met, the results may be assumed to be incorrect and the model may be modified accordingly. In some exemplary embodiments, users may provide input to verify or falsify the estimation of the Artifact Severity Estimator 240.

It will be noted that in the disclosed subject matter textual similarity between two documents may be inferred due to different metrics, some metrics are described herein but the disclosed subject matter is not limited specifically to such examples. In some exemplary embodiments, a connection between two documents may be deduced in view of both documents containing similar texts as a whole. Additionally or alternatively, a connection may be deduced in view of both documents using similar keywords. Additionally or alternatively, a connection may be deduced in view of both documents adhering to a similar pattern. As an example, one pattern may be a written monologue, while another pattern may be a conversation between two people which is textually recorded. Other patterns may be used as well.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the processor being adapted to perform the steps of:
    obtaining one or more textual reports indicating potential defects in a program product, wherein each textual report is associated with an artifact of the program product;
    automatically analyzing the one or more textual reports and artifacts to estimate severity of potential errors in the artifacts of the program product, wherein said automatically analyzing comprises:
        utilizing a statistical model to estimate the severity based on content of the one or more textual reports, wherein the statistical model is trained with respect to a training dataset, wherein the artifact comprises text, and wherein the statistical model is configured to analyze the text of the artifact to estimate severity; and
    determining a subset of the artifacts based on the estimated severity.

2. The apparatus of claim 1, wherein said processor is further adapted to indicate to a user a list of artifacts upon which a quality assurance activity is to be performed, wherein the list lists the subset of artifacts.

3. The apparatus of claim 2, wherein the quality assurance activity is selected from the group consisting of testing an artifact and manually reviewing an artifact.

4. The apparatus of claim 1, wherein the statistical model is configured to estimate an artifact with which the one or more textual reports are associated.

5. The apparatus of claim 1, wherein each textual report of the one or more textual reports comprises, in addition to free-text, structured data which indicates an artifact with which the textual report is associated.

6. The apparatus of claim 1, wherein said processor is further adapted to perform:
    in response to receiving indication that an estimation of a severity of an artifact is incorrect, updating the statistical model with the artifact and a modified severity estimation; and
    re-analyzing the textual reports and artifacts to estimate a potentially different severity.

7. The apparatus of claim 1, wherein the textual report is a manual report selected from the group consisting of: a problem report provided by a user of the program product and a defect report provided by quality assurance personnel.

8. The apparatus of claim 1, wherein the program product is comprised of the artifacts, and wherein the artifacts are program code.

9. The apparatus of claim 1, wherein the artifacts are selected from the group consisting of requirement documents and design documents.

10. A method comprising:
    obtaining one or more textual reports indicating potential defects in a program product, wherein each textual report is associated with an artifact of the program product;
    automatically analyzing, by a processor, the one or more textual reports and artifacts to estimate severity of potential errors in the artifacts of the program product, wherein said automatically analyzing comprises:
        utilizing a statistical model to estimate the severity based on content of the one or more textual reports, wherein the statistical model is trained with respect to a training dataset;
    determining, by the processor, a subset of the artifacts based on the estimated severity;
    in response to receiving indication that an estimation of a severity of an artifact is incorrect, updating the statistical model with the artifact and a modified severity estimation; and
    re-analyzing the one or more textual reports and artifacts to estimate a potentially different severity.

11. The method of claim 10 further comprising indicating to a user a list of artifacts upon which a quality assurance activity is to be performed, wherein the list lists the subset of artifacts.

12. The method of claim 10, wherein the statistical model is configured to estimate an artifact with which the one or more textual reports are associated.

13. The method of claim 10, wherein the artifact comprises text, wherein the statistical model is configured to analyze the text of the artifact to estimate severity.

14. The method of claim 10, wherein each textual report of the one or more textual reports comprises, in addition to free-text, structured data which indicates an artifact with which the one or more textual reports are associated.

15. A computer program product comprising a non-transitory computer readable medium retaining program instructions, which when read by a processor, cause the processor to:
    obtain one or more textual reports indicating potential defects in a program product, wherein each textual report is associated with an artifact of the program product;

automatically analyze the one or more textual reports and artifacts to estimate severity of potential errors in the artifacts of the program product, wherein said automatically analyze comprises:
   utilizing a statistical model to estimate the severity based on content of the one or more textual reports, wherein the statistical model is trained with respect to a training dataset;
determine a subset of the artifacts based on the estimated severity;
in response to receiving indication that an estimation of a severity of an artifact is incorrect, update the statistical model with the artifact and a modified severity estimation; and
re-analyze the one or more textual reports and artifacts to estimate a potentially different severity.

* * * * *